United States Patent
Yui (10) Patent No.: US 12,401,027 B2
(45) Date of Patent: *Aug. 26, 2025

(54) ANODE ACTIVE MATERIAL, METHOD FOR PRODUCING ANODE ACTIVE MATERIAL AND LITHIUM ION BATTERY

(71) Applicant: TOYOTA JIDOSHA KABUSHIKI KAISHA, Toyota (JP)

(72) Inventor: Yuhki Yui, Zama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,915

(22) Filed: May 21, 2024

(65) Prior Publication Data

US 2024/0304801 A1    Sep. 12, 2024

Related U.S. Application Data

(63) Continuation of application No. 17/487,654, filed on Sep. 28, 2021, now Pat. No. 12,027,698.

(30) Foreign Application Priority Data

Oct. 6, 2020    (JP) .................. 2020-169081

(51) Int. Cl.
*H01M 4/485* (2010.01)
*H01M 4/02* (2006.01)
(Continued)

(52) U.S. Cl.
CPC .......... *H01M 4/485* (2013.01); *H01M 4/525* (2013.01); *H01M 10/0525* (2013.01); *H01M 10/0585* (2013.01); *H01M 2004/027* (2013.01)

(58) Field of Classification Search
CPC .. H01M 4/485; H01M 4/525; H01M 10/0525; H01M 10/0585; H01M 2004/027; H01M 4/5815; C01P 2002/34

See application file for complete search history.

(56) References Cited

U.S. PATENT DOCUMENTS

| 2011/0285353 A1 | 11/2011 | Niwa et al. |
| 2012/0161075 A1 | 6/2012 | Chen et al. |
| 2016/0087274 A1 | 3/2016 | Nakayama |

FOREIGN PATENT DOCUMENTS

| CN | 1790554 A | 6/2006 |
| DE | 102011014958 A1 | 6/2012 |
| WO | 2016/036091 A1 | 3/2016 |

OTHER PUBLICATIONS

So Yubuchi et al., "All-solid-state cells with Li4Ti5O12/carbon nanotube composite electrodes prepared by infiltration with argyrodite sulfide-based solid electrolytes via liquid-phase processing", Journal of Power Sources, vol. 417 (2019) 125-131.

(Continued)

*Primary Examiner* — Matthew T Martin
*Assistant Examiner* — Alexandra J Simmons
(74) *Attorney, Agent, or Firm* — Oliff PLC (57) ABSTRACT

A main object of the present disclosure is to provide an anode active material having excellent electron conductivity and ion conductivity. The present disclosure achieves the object by providing an anode active material to be used for a lithium ion battery, the anode active material including at least a Sr element and a S element, and a Perovskite type of crystal phase belonging to a space group of I4/mmm, and a molar ratio of the S element with respect to the Sr element is larger than 0.1.

5 Claims, 3 Drawing Sheets

(51) Int. Cl.
    *H01M 4/525*       (2010.01)
    *H01M 10/0525*    (2010.01)
    *H01M 10/0585*    (2010.01)

(56) References Cited

OTHER PUBLICATIONS

Jun. 7, 2023 Office Action Issued in U.S. Appl. No. 17/487,654.
Oct. 25, 2023 Office Action Issued in U.S. Appl. No. 17/487,654.
Karaphun et al. "Electrochemical and Magnetic Properties of Electrospun SrTi1-xFexO3(x=0,0.05 and 0.10) Nanofibers for Anodes of Li-Ion Batteries", Journal of Superconductivity and Novel Magnetism vol. 31, Nov. 17, 2021, pp. 1909-1916.
Pai et al. "Boosting ionic conductivity in antiperovskite Li3OCl via defect engineering: Interstitial versus vacancy", Physical Review Materials, vol. 3, Nov. 27, 2019, pp. 115402-1-115402-7.
Huo et al., "Structural, magnetic and transport properties of S doping in Sr2FeMoO6 compound", Elsevier, Solid State Sciences 76, p. 85-91 (Year: 2017).
Lee et al., "WO2016036091 English Translation", Mar. 10, 2016.
Mar. 29, 2024 Notice of Allowance issued in U.S. Appl. No. 17/487,654.

ANODE ACTIVE MATERIAL, METHOD FOR PRODUCING ANODE ACTIVE MATERIAL AND LITHIUM ION BATTERY

CROSS REFERENCE TO RELATED APPLICATION

This application is a continuation of U.S. application Ser. No. 17/487,654, filed Sep. 28, 2021, the contents of which are incorporated herein by reference.

TECHNICAL FIELD

The present disclosure relates to an anode active material, a method for producing the anode active material and a lithium ion battery.

BACKGROUND ART

In recent years, the development of a battery has been actively carried out. For example, the development of a battery used for a battery electric vehicle or a hybrid electric vehicle, and an active material to be used for the battery has been advanced in the automobile industry.

For example, Non-Patent Literature 1 discloses an all solid state battery provided with an anode containing $Li_4Ti_5O_{12}$ (LTO) as an anode active material, carbon nanotube, and a solid electrolyte.

CITATION LIST

Non-patent Literature

Non-patent Literature 1: So Yubuchi et al., "All-solid-state cells with $Li_4Ti_5O_{12}$/carbon nanotube composite electrodes prepared by infiltration with argyrodite sulfide-based solid electrolytes via liquid-phase processing", Journal of Power Sources, 417 (2019) 125-131

SUMMARY OF DISCLOSURE

Technical Problem

Although LTO has excellent capacity properties, LTO has neither electron conductivity nor ion conductivity. For this reason, when such an anode active material neither having electron conductivity nor ion conductivity is used, it is general to add a conductive material giving electron conductivity and an electrolyte giving ion conductivity to the anode. On the other hand, due to the addition of these materials, there is a risk that the battery capacity may be degraded when the ratio of the anode active material in the anode is decreased.

The present disclosure has been made in view of the above circumstances, and a main object thereof is to provide an anode active material having excellent electron conductivity and ion conductivity.

Solution to Problem

In order to solve the above problem, the present disclosure provides an anode active material to be used for a lithium ion battery, the anode active material comprising at least a Sr element and a S element, and a Perovskite type of crystal phase belonging to a space group of I4/mmm, and a molar ratio of the S element with respect to the Sr element is larger than 0.1.

According to the present disclosure, an anode active material may have excellent electron conductivity and ion conductivity since the ratio of the S element with respect to the Sr element is larger than the specified value, and the specified crystal phase is included.

In the disclosure, the molar ratio may be 1.5 or more.

In the disclosure, the anode active material may further comprise an O element.

In the disclosure, the anode active material may further comprise a metal element M other than a Sr element and a S element, and the M may be at least one kind of Nb, Zr, Mn, Sn, Mo, Fe, and Ti.

In the disclosure, the M may be at least Fe and Ti.

The present disclosure also provides a method for producing the above-described anode active material, the method comprising: a preparing step of preparing a raw material mixture that contains a first metal element source containing a Sr element, a second metal element source containing a S element, and a third metal element source containing a metal element other than a Sr element and a S element; a precursor preparing step of obtaining a precursor by conducting mechanical milling to the raw material mixture; and a burning step of burning the precursor.

According to the present disclosure, by mechanical milling the raw material mixture containing the first metal element source, the second metal element source and the third metal element source, the above-described anode active material in the present disclosure may be easily produced.

The present disclosure also provides a lithium ion battery including a cathode active material layer containing a cathode active material, an anode active material layer containing an anode active material, and an electrolyte layer formed between the cathode active material layer and the anode active material layer; wherein the anode active material comprises: at least a Sr element and a S element; and a Perovskite type of crystal phase belonging to a space group of I4/mmm; and a molar ratio of the S element with respect to the Sr element is larger than 0.1.

According to the present disclosure, the anode active material layer contains the specified anode active material, and thus the lithium ion battery may have excellent capacity properties.

In the disclosure, the lithium ion battery may be an all solid lithium ion battery.

In the disclosure, the anode active material layer may have neither a conductive material nor a solid electrolyte.

Advantageous Effects of Disclosure

The present disclosure exhibits an effect of providing an anode active material with excellent electron conductivity and ion conductivity.

DESCRIPTION OF EMBODIMENTS

The anode active material, the method for producing the anode active material and the lithium ion battery in the present disclosure will be hereinafter described in details.

A. Anode Active Material

The anode active material in the present disclosure is an anode active material to be used for a lithium ion battery, the anode active material comprising: at least a Sr element and a S element, and a Perovskite type of crystal phase belonging to a space group of I4/mmm, and a molar ratio of the S element with respect to the Sr element is larger than 0.1.

According to the present disclosure, an anode active material may have excellent electron conductivity and ion conductivity since the ratio of the S element with respect to the Sr element is larger than the specified value, and the specified crystal phase is included.

As described in the above-mentioned Non-Patent Literature 1, LTO has been known as an anode active material with high capacity. On the other hand, since LTO has neither electron conductivity nor ion conductivity, it is general to add a conductive material and an electrolyte to an anode. In that case, there is a risk that the battery capacity may be degraded since the proportion of the anode active material in the anode decreases. Meanwhile, the inventor of the present disclosure has found that the anode active material in the present disclosure has excellent electron conductivity and ion conductivity. Also, with such an anode active material, the anode does not need to include a conductive material and an electrolyte, and thus the proportion of the anode active material in the anode may be increased. As a result, a lithium ion battery may have excellent capacity properties.

The anode active material in the present disclosure comprises at least a Sr element and a S element. In the anode active material, the molar ratio of the S element with respect to the Sr element is larger than 0.1; for example, it is 0.5 or more, may be 1 or more, and may be 1.5 or more. Meanwhile, the molar ratio is, for example, 2.0 or less. If the molar ratio is 0.1 or less, the anode active material will not have excellent ion conductivity.

Also, the anode active material in the present disclosure may further comprise an O element. When the anode active material comprises an O element, the molar ratio (S/O) of the S element with respect to the O element is, for example, 0.04 or more, may be 0.1 or more, may be 0.2 or more, and may be 0.3 or more. Meanwhile, S/O is, for example, 1 or less, may be 0.7 or less, and may be 0.5 or less.

Also, the anode active material in the present disclosure may further comprise a metal element M other than a Sr element and a S element. The M is preferably at least one of Nb, Zr, Mn, Sn, Mo, Fe, and Ti. In particular, the M is preferably at least Fe and Ti. The molar ratio (Fe/Ti) of Fe with respect to Ti is, for example, 0.1 or more, may be 0.5 or more, and may be 0.9 or more. Meanwhile, Fe/Ti is, for example, 6 or less, may be 4 or less, and may be 2 or less.

The composition of the anode active material in the present disclosure is not particularly limited, but is preferably represented by, for example, $(Sr_{1-x}M^1_x)_a M^2_b (O_{1-y}S_{y+\alpha})_c$. In the formula, $M^1$ is at least one of Nb, Zr, Mn, Sn, and Mo. Also, $M^2$ is at least one of Fe and Ti. Also, "a" is, for example, 1.5 or more, may be 1.7 or more, and may be 1.9 or more. Meanwhile, "a" is, for example, 2.5 or less, may be 2.3 or less, and may be 2.1 or less. For example, "b" is 1.5 or more, may be 1.7 or more, and may be 1.9 or more.

Meanwhile, "b" is, for example, 2.5 or less, may be 2.3 or less, and may be 2.1 or less. For example, "c" is 5.5 or more, may be 5.7 or more, and may be 5.9 or more. Meanwhile, "c" is, for example, 6.5 or less, may be 6.3 or less, and may be 6.1 or less. Also, "x" is, for example, 0.2 or more and may be 0.4 or more. Meanwhile, "x" is, for example, less than 1, may be 0.8 or less, and may be 0.6 or less. Also, "y" is, for example, 0.05 or more, may be 0.10 or more, and may be 0.20 or more. Meanwhile, "y" is, for example, 1.00 or less, may be 0.80 or less, may be 0.60 or less, and may be 0.40 or less. "α" may be 0 and may be larger than 0. In the latter case, "α" is, for example, 0.03 or more and may be 0.10 or more. Meanwhile, "α" is, for example, 0.40 or less and may be 0.30 or less.

The anode active material in the present disclosure comprises a Perovskite type of crystal phase belonging to a space group of I4/mmm. In particular, the anode active material preferably has the Perovskite type of crystal phase belonging to the space group of I4/mmm as a main phase. "Having the Perovskite type of crystal phase belonging to the space group of I4/mmm as a main phase" means that the peak belonging to the aforementioned crystal phase has the largest diffraction intensity among the peaks observed in an X-ray diffraction measurement. The proportion of the aforementioned crystal phase with respect to all the crystal phases in the anode active material is, for example, 50 mol % or more, may be 70 mol % or more, may be 90 mol % or more, and may be 100 mol %.

Whether the anode active material has the Perovskite type of crystal phase belonging to the space group of I4/mmm can be confirmed by, for example, conducting an X-ray structural diffraction measurement (powder XRD measurement). In an XRD measurement using a Cu-Kα ray, the Perovskite type of crystal phase belonging to the space group I4/mmm preferably has typical peaks at 2θ=32.1°, 40.8°, 46.5°, 58.3°, and 68.6°. Incidentally, each of these peaks may shift in the range of ±0.8°. The range may be ±0.5°, may be ±0.3°, and may be ±0.1°.

There are no particular limitations on the shape of the anode active material, and examples thereof may include a granular shape. The average particle size ($D_{50}$) of the anode active material is, for example, 50 nm or more and 50 μm or less. The average particle size can be obtained by, for example, observation with SEM. The number of samples is preferably large; for example, it is 100 or more.

The anode active material in the present disclosure is used for later described lithium ion battery.

B. Method for Producing Anode Active Material

Figure 1:
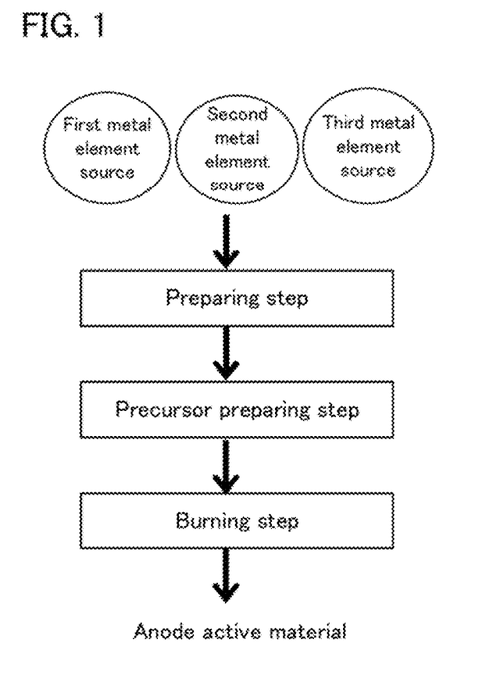
FIG. 1 is a flow chart illustrating an example of the method for producing the anode active material in the present disclosure.

FIG. 1 is a flow-chart illustrating an example of the method for producing the anode active material in the present disclosure. The method for producing the anode active material in the present disclosure comprises: a preparing step of preparing a raw material mixture that contains a first metal element source containing a Sr element, a second metal element source containing a S element, and a third metal element source containing a metal element other than a Sr element and a S element; a precursor preparing step of obtaining a precursor by conducting mechanical milling to the raw material mixture; and a burning step of burning the precursor.

According to the present disclosure, by mechanical milling the raw material mixture containing the first metal element source, the second metal element source and the third metal element source, the above-described anode active material in the present disclosure may be easily produced. This is because the usage of the third metal element other than a Sr element and a S element facilitates the take-in of S elements into the crystal structure, and increase in the dope of S elements is possible.

1. Preparing Step

The preparing step in the present disclosure is a step of preparing a raw material mixture that contains a first metal element source containing a Sr element, a second metal element source containing a S element, and a third metal element source containing a metal element other than a Sr element and a S element. The raw material mixture may be fabricated by oneself or may be purchased from others.

The first metal element source contains a Sr element. Also, the first metal element source may further contain at least one of a S element and an O element. The first metal element source may be the same material as a second metal element source. Examples of the Sr element source may include a simple substance of Sr, SrS and SrO. The first metal element source may be just one kind, and may be two kinds or more.

The second metal element source contains a S element. Also, the second metal element source may further contain at least one of a Sr element and a later described third metal element source. The second metal element source may be the same material as the first metal element source. Also, the second metal element source may be the same material as the later described third metal element source. Examples of the second metal element source may include a simple substance of S, SrS and $ZrS_2$. The second metal element source may be just one kind, and may be two kinds or more.

The third metal element source contains a metal element other than a Sr element and a S element. The metal element (third metal element) is preferably the metal M described in "A. Anode active material." Also, the third metal element source may further contain at least one of a Sr element, a S element, and an O element. The third metal element source may be the same material as the first metal element source and the second metal element source. Examples of the third metal element source may include $ZrS_2$, $Nb_2O_5$, $Fe_2O_3$, $TiO_2$, $MnO_2$ and $MOO_3$. The third metal element source may be just one kind, and may be two kinds or more.

There are no particular limitations on the ratio of the first metal element source, the second metal element source and the third metal element source in the raw material mixture if the ratio allows the aforementioned anode active material to be obtained.

2. Precursor Preparing Step

The precursor preparing step in the present disclosure is a step of obtaining a precursor by conducting mechanical milling to the raw material mixture.

There are no particular limitations on the mechanical milling if it is a method of mixing the raw material mixture while applying mechanical energy, and examples thereof may include ball milling, vibration milling, turbo milling, mechano-fusion, and disc milling. Planetary ball milling is particularly preferable. Also, the mechanical milling may be dry mechanical milling and may be wet mechanical milling.

Conditions of the mechanical milling are appropriately arranged so as to obtain the desired anode active material. For example, when planetary ball milling is used, the raw material mixture and balls for crushing thereof will be put in a container, and the treatment will be conducted with a specific weighing table revolving speed and time. The weighing table revolving speed is, for example, 200 rpm or more and 800 rpm or less. Also, the treatment time of the planetary ball milling is, for example, 30 minutes or more and 100 hours or less. Examples of the materials of the container and balls for crushing to be used in the planetary ball milling may include $ZrO_2$ and $Al_2O_3$. The diameter of the balls for crushing is, for example, 1 mm or more and 20 mm or less.

3. Burning Step

The burning step in the present disclosure is a step of burning the precursor.

There are no particular limitations on the burning temperature as long as the anode active material having the Perovskite type of crystal phase can be obtained, but for example, it is 800° C. or more and 1400° C. or less, and may be 1000° C. or more and 1200° C. or less. Also, there are no particular limitations on the burning time, but for example, it is 24 hours or more and 384 hours or less, and may be 48 hours or more and 192 hours or less. Also, the burning may be conducted in a normal pressure atmosphere, may be conducted in a reduced pressure atmosphere, and may be conducted in an inert atmosphere such as an Ar atmosphere.

4. Anode Active Material

The anode active material obtained by the aforementioned steps is in the same contents as those described in "A. Anode active material" above; thus, the descriptions herein are omitted.

C. Lithium Ion Battery

Figure 2:
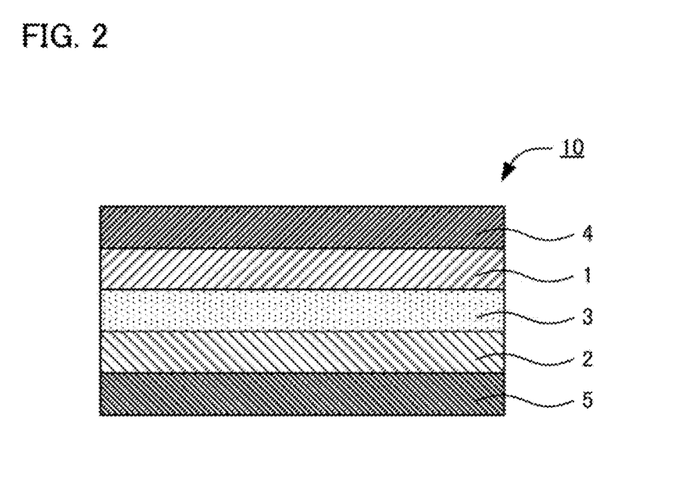
FIG. 2 is a schematic cross-sectional view illustrating an example of the lithium ion battery in the present disclosure.

FIG. 2 is a schematic cross-sectional view illustrating an example of the lithium ion battery in the present disclosure. Lithium ion battery 10 illustrated in FIG. 2 includes cathode active material layer 1, anode active material layer 2 comprising the anode active material, electrolyte layer 3 formed between cathode active material layer 1 and anode active material layer 2, cathode current collector 4 for collecting currents of cathode active material layer 1, and anode current collector 5 for collecting currents of anode active material layer 2. The anode active material refers to the aforementioned anode active material in the present disclosure.

The lithium ion battery in the present disclosure may be a lithium ion battery with excellent capacity properties when the anode active material layer contains the specified anode active material.

1. Anode Active Material Layer

The anode active material layer contains at least an anode active material. The anode active material is in the same contents as those described in "A. Anode active material" above; thus, the descriptions herein are omitted. The anode active material layer may further contain at least one of a conductive material and an electrolyte, in addition to the anode active material, but it is preferable not to contain a conductive material and an electrolyte. "Not to contain a conductive material and an electrolyte" means that the total proportion of the conductive material and the electrolyte in the anode active material layer is 5 weight % or less. The total proportion of the conductive material and the electrolyte may be 3 weight % or less, may be 1 weight % or less, and may be 0 weight %.

Examples of the conductive material may include a carbon material. Examples of the carbon material may include a particulate carbon material such as acetylene black (AB) and Ketjen black (KB), and a fiber carbon material such as carbon fiber, carbon nanotube (CNT), and carbon nanofiber (CNF). The electrolyte will be described in "3. Electrolyte layer" later.

The thickness of the anode active material layer is, for example, 0.1 μm or more and 1000 μm or less.

2. Cathode Active Material Layer

The cathode active material layer contains at least a cathode active material, and may contain a conductive material and an electrolyte, as required. Examples of the cathode active material may include an oxide active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li_4Ti_5O_{12}$ and $Li(Ni_{0.5}Mn_{1.5})O_4$; and an olivine type active material such as $LiFePO_4$, $LiMnPO_4$, $LiNiPO_4$, and $LiCoPO_4$. The surface of the cathode active material may be coated with a Li-ion conductive oxide. Examples of the Li-ion conductive oxide may include $LiNbO_3$. The conductive material and the electrolyte are the same as the above.

The thickness of the cathode active material layer is, for example, 0.1 μm or more and 1000 μm or less.

3. Electrolyte Layer

The electrolyte layer is a layer containing at least an electrolyte. The electrolyte may be a solid electrolyte, an electrolyte solution (liquid electrolyte), and may be a mixture of those. Among those, the electrolyte is preferably a solid electrolyte. Examples of the solid electrolyte may include an inorganic solid electrolyte such as a sulfide solid electrolyte, an oxide solid electrolyte, a nitride solid electrolyte, and a halide solid electrolyte; and an organic polymer electrolyte such as a polymer electrolyte. Among these, a sulfide solid electrolyte is particularly preferable.

The thickness of the electrolyte layer is, for example, 0.1 μm or more and 1000 μm or less.

4. Lithium Ion Battery

The lithium ion battery in the present disclosure may be a liquid battery and may be an all solid state battery, but the latter is preferable. "All solid state battery" in the present disclosure refers to a lithium ion battery in which the aforementioned electrolyte layer is a solid electrolyte layer containing a solid electrolyte. Also, the lithium ion battery in the present disclosure may be a primary battery and may be a secondary battery, but preferably a secondary battery among them. The reason therefor is to be repeatedly charged and discharged and useful as a car-mounted battery for example. Also, examples of the shape of the battery may include a coin shape, a laminate shape, a cylindrical shape and a square shape.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

Synthesis of Anode Active Material

Figure 3:
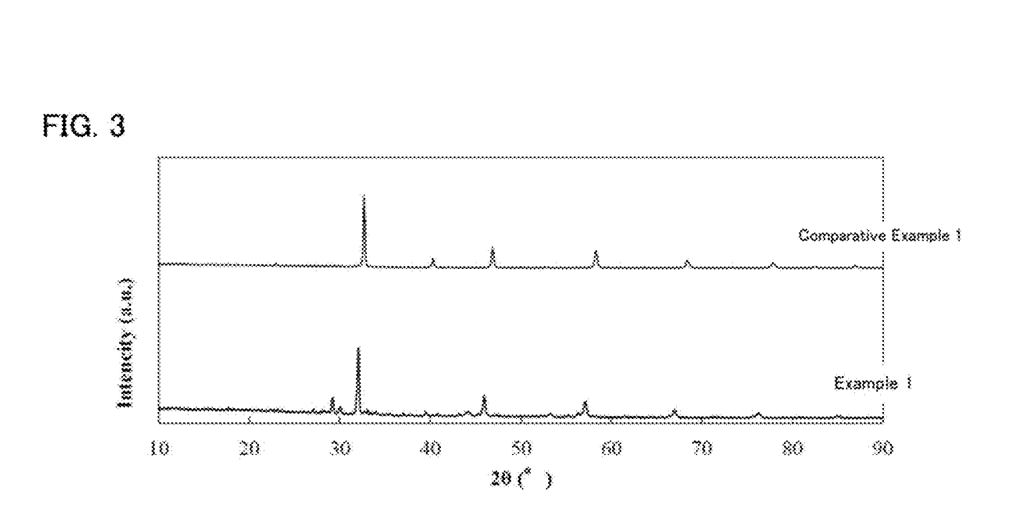
FIG. 3 is a chart showing XRD patterns of Example 1 and Comparative Example 1.

As raw materials, 0.43085 g of SrS, 0.31897 g of $Nb_2O_5$, 0.38326 g of $Fe_2O_3$, 0.0958 g of $TiO_2$, and 0.07696 g of S were weighed and mixed with a mortar. After that, the mixture was mixed for 1 hour at 300 rpm by planetary ball milling with zirconia balls of φ5 mm. The mixed raw material was made into pellet by a hydraulic press machine, and vacuum-burned in conditions of temperature rising speed of 0.7° C./min, burning temperature of 1000° C., burning time of 96 hours, and in quartz glass atmosphere. As for temperature dropping speed, the material was naturally cooled. In this manner, an anode active material $(Sr_{1.2}Nb_{0.8}Fe_{1.6}Ti_{0.4}O_{5.2}S_2)$ was obtained. In an XRD measurement to the obtained anode active material, Perovskite structure of space group I4/mmm was confirmed. The result of XRD is shown in FIG. 3 with later described Comparative Example 1.

<Production of Battery>

A sulfide-based solid electrolyte was weighted to be 100 mg, filled in a cylinder of φ11.28 mm, and pressed by uniaxial press under the pressure of 1 ton/cm². Thereby, a separator was produced. Next, the synthesized anode active material $(Sr_{1.2}Nb_{0.8}Fe_{1.6}Ti_{0.4}O_{5.2}S_2)$ was weighed to be 8 mg, filled in a cylinder, and pressed by uniaxial press under the pressure of 6 ton/cm² to form a working electrode. As a counter electrode, metal Li was put and pressed by uniaxial press under the pressure of 0.5 ton/cm². Pins made of SUS were put from the both ends and restrained under the pressure of 20 kgf to produce an evaluation cell (battery).

Example 2

An anode active material was synthesized by replacing the raw materials with 0.31089 g of SrO, 0.46606 g of $ZrS_2$, 0.38326 g of $Fe_2O_3$, and 0.0958 g of $TiO_2$. A battery was produced in the same manner as in Example 1 except for the replacement. Incidentally, although the proportion of O elements in the anode active material of Example 2 was not clearly specified due to charge compensation relation, the composition was presumed to be $SrZrFe_{1.6}Ti_{0.4}O_{4.2+x}S_2$ (0≤x≤1) since the Perovskite type of crystal phase was confirmed.

Example 3

An anode active material $(SrMnFe_{1.6}Ti_{0.4}O_{5.2}S_2)$ was synthesized by replacing the raw materials with 0.35904 g of SrS, 0.26082 g of $MnO_2$, 0.38326 g of $Fe_2O_3$, 0.0958 g of $TiO_2$, and 0.0962 g of S. A battery was produced in the same manner as in Example 1 except for the replacement.

Example 4

An anode active material $(Sr_{1.1}Sn_{0.8}Fe_{1.8}Ti_{0.4}O_{5.1}S_2)$ was synthesized by replacing the raw materials with 0.35904 g of SrS, 0.31897 g of $SnO_2$, 0.38326 g of $Fe_2O_3$, 0.0958 g of $TiO_2$, and 0.07696 g of S. A battery was produced in the same manner as in Example 1 except for the replacement.

Example 5

An anode active material $(Sr_{1.3}Mo_{0.7}Fe_{1.6}Ti_{0.4}O_{5.2}S_2)$ was synthesized by replacing the raw materials with 0.46675 g of SrS, 0.30227 g of $MoO_3$, 0.38326 g of $Fe_2O_3$, 0.0958 g of $TiO_2$, and 0.06734 g of S. A battery was produced in the same manner as in Example 1 except for the replacement.

Comparative Example 1

As raw materials, 1.476 g of $SrCO_3$, 0.639 g of $Fe_2O_3$, and 0.160 g of $TiO_2$ were used. The materials were mixed with mortar, made into pellet by a hydraulic press machine, and burned in conditions of temperature rising speed of 0.7° C./min, burning temperature of 1000° C., burning time of 96 hours, and in air atmosphere. As for temperature dropping speed, the material was naturally cooled. In this manner, an anode active material $(SrFe_{0.8}Ti_{0.2}O_3)$ was synthesized. A battery was produced in the same manner as in Example 1 except for the above.

Comparative Example 2

As raw materials, 570 mg of $SrFe_{0.8}Ti_{0.2}O_3$ produced in Comparative Example 1 and 19 mg of S were used. The materials were mixed with mortar, made into pellet by a hydraulic press machine, and vacuum-burned in conditions of temperature rising speed of 0.7° C./min, burning temperature of 1000° C., burning time of 96 hours, and in quartz glass atmosphere. As for temperature dropping speed, the material was naturally cooled. In this manner, an anode active material ($Sr_2Fe_{1.6}Ti_{0.4}O_{5.6}S_{0.2}$) was synthesized. A battery was produced in the same manner as in Example 1 except for the above.

Comparative Example 3

As an anode active material, commercial product $Li_4Ti_5O_{12}$ was used. A battery was produced in the same manner as in Example 1 except for the replacement.

Evaluation

Figure 4:
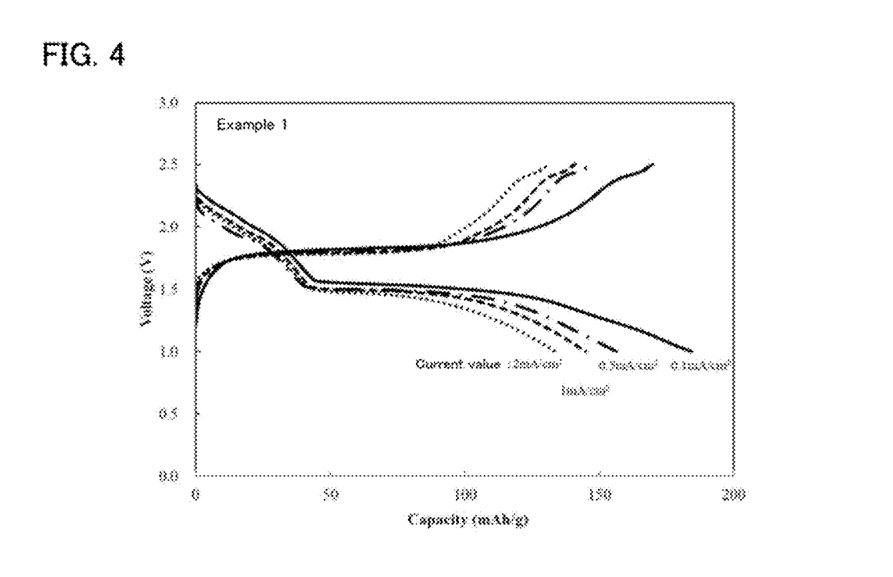
FIG. 4 is a chart showing a charge and discharge curve per current value of Example 1.
Figure 5:
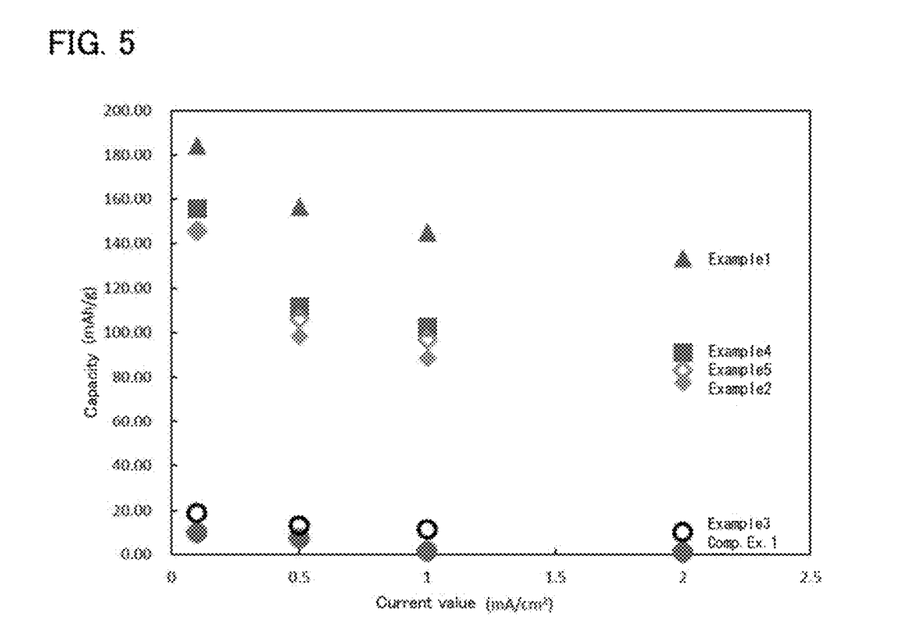
FIG. 5 is a chart plotting capacity per current value of Examples 1 to 5 and Comparative Example 1.

Evaluations of battery properties were conducted to each of the batteries obtained in Examples 1 to 5 and Comparative Examples 1 to 3 in the following manners. The evaluation cell was arranged in a charge and discharge device (HJ-SD8 from HOKUTO DENKO CORPORATION), and evaluation of rate properties (reversible capacity) was conducted in the voltage range of 1.0 to 2.5 V, and at the current value of 0.1 mA/cm², 0.5 mA/cm², 1 mA/cm², and 2 mA/cm². Also, cycle evaluations at the current value of 0.5 mA/cm² was conducted for 10 times, and the capacity maintenance rate after 10 cycles was calculated. The results are shown in FIG. 1. Also, charge and discharge curves of Example 1 per current value are shown in FIG. 4. Also, the capacities of Examples 1 to 5 and Comparative Example 1 per current value are plotted in FIG. 5.

low rate, and thus the plotting was not possible. These results show that the batteries of Examples 1 to 5 were charged and discharged well even when the anode active material layer therein contained neither a conductive material nor an electrolyte, and the anode active material in the present disclosure has excellent ion conductivity and electron conductivity.

Reasons why the anode active material of Examples 1 to 5 has excellent ion conductivity and electron conductivity are not certain, but the reasons are presumably as follows. The anode active material of Comparative Example 1 was in black color, and thus presumably had electron conductivity if with the Perovskite structure including a Sr element. However, it is presumed that the battery activity did not appear without electrolyte since there was no ion conductivity. It is presumed that putting S more than necessary to such state allowed Li-ions to hop on the spots of S to make ion conduction possible.

Incidentally, when the dope of S was made larger than that of Comparative Example 2 without changing the amount of the third metal element, impurities remained a lot. For this reason, it was suggested that the proportion of the third metal element is preferably larger when the dope of S is increased, as shown in Examples 1 to 5.

REFERENCE SIGNS LIST 1 cathode active material layer
2 anode active material layer
3 electrolyte layer
4 cathode current collector
5 anode current collector

TABLE 1

| | Composition of anode active material | Reversible Capacity (mAh/g) | | | | Capacity maintenance rate (%) |
|---|---|---|---|---|---|---|
| | | 0.1 mA/cm² | 0.5 mA/cm² | 1 mA/cm² | 2 mA/cm² | |
| Example1 | $Sr_{1.2}Nb_{0.8}Fe_{1.6}Ti_{0.4}O_{5.2}S_2$ | 184 | 156 | 145 | 133 | 97 |
| Example2 | $SrZrFe_{1.6}Ti_{0.4}O_{4.2+x}S_2$ | 145 | 121 | 114 | 106 | 97 |
| Example3 | $SrMnFe_{1.6}Ti_{0.4}O_{5.2}S_2$ | 19 | 13 | 11 | 10 | 95 |
| Example4 | $Sr_{1.1}Sn_{0.8}Fe_{1.8}Ti_{0.4}O_{5.1}S_2$ | 156 | 112 | 102 | 91 | 96 |
| Example5 | $Sr_{1.3}Mo_{0.7}Fe_{1.6}Ti_{0.4}O_{5.2}S_2$ | 146 | 106 | 97 | 83 | 96 |
| Comp. Ex. 1 | $SrFe_{0.8}Ti_{0.2}O_3$ | 10 | 7 | 1 | 1 | — |
| Comp. Ex. 2 | $Sr_2Fe_{1.6}Ti_{0.4}O_{5.6}S_{0.2}$ | 7 | 6 | 1 | 1 | — |
| Comp. Ex. 3 | $Li_4Ti_5O_{12}$ | 0.0001 | — | — | — | — |

From the XRD pattern shown in FIG. 3, peaks derived from Perovskite structure were confirmed at the positions in the vicinity of 2θ=32.1°, 40.8°, 46.5°, 58.3°, and 68.6° were confirmed in both Example 1 and Comparative Example 1. It was confirmed that the anode active material of Comparative Example 1 was just with Perovskite structure since there was no impurities. On the other hand, it was confirmed that the Example 1 had Perovskite structure of the space group of I4/mmm as a main phase although there was a little impurities.

Also, from the charge and discharge curves shown in FIG. 4, it was confirmed that the battery of Example 1 had a voltage flat part at approximately 1.5 V and the battery worked well. Also, from the plot of rate properties of each Example and Comparative Example shown in Table 1 and FIG. 5, it was confirmed that excellent battery capacities were obtained in Examples 1 to 5. Incidentally, Comparative Examples 2 and 3 could not charge or discharge even at the 10 lithium ion battery

The invention claimed is:

1. A vehicle comprising a lithium ion battery including a cathode active material layer containing a cathode active material, an anode active material layer containing an anode active material, and an electrolyte layer formed between the cathode active material layer and the anode active material layer; wherein
  the anode active material comprises:
    a composition represented by $(Sr_{1-x}M^1{}_x)_aM^2{}_b(O_{1-y}S_{y+\alpha})_c$, wherein $M^1$ is at least one of Nb, Zr, Mn, Sn, and Mo, $M^2$ is at least one of Fe and Ti, a is 1.5 or more and 2.5 or less, b is 1.5 or more and 2.5 or less, c is 5.5 or more and 6.5 or less, x is 0.2 or more and less than 1, y is 0.05 or more and 1.00 or less, and α is 0 or more and 0.40 or less; and
    a Perovskite type of crystal phase belonging to a space group of I4/mmm as a main phase;

wherein a molar ratio of the S element with respect to the Sr element is larger than 0.1.

2. The vehicle according to claim 1, wherein the molar ratio is 1.5 or more.

3. The vehicle according to claim 1, wherein the lithium ion battery is an all solid lithium ion battery.

4. The vehicle according to claim 1, wherein the anode active material layer contains neither a conductive material nor a solid electrolyte.

5. The vehicle according to claim 1, wherein the composition of the anode active material is represented by $Sr_{1.2}Nb_{0.8}Fe_{1.6}Ti_{0.4}O_{5.2}S_2$, $SrZrFe_{1.6}Ti_{0.4}O_{4.2+x}S_2$, where $0 \leq x \leq 1$ is satisfied, $SrMnFe_{1.6}Ti_{0.4}O_{5.2}S_2$, or $Sr_{1.3}Mo_{0.7}Fe_{1.6}Ti_{0.4}O_{5.2}S_2$.

* * * * *